United States Patent
Lee

(10) Patent No.: US 9,659,167 B2
(45) Date of Patent: May 23, 2017

(54) HANDHELD ELECTRONIC DEVICE AND METHOD FOR ENTERING PASSWORD THEREOF

(71) Applicant: Wistron Corporation, New Taipei (TW)

(72) Inventor: Chien-Feng Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 93 days.

(21) Appl. No.: 14/659,623

(22) Filed: Mar. 17, 2015

(65) Prior Publication Data

US 2016/0180077 A1   Jun. 23, 2016

(30) Foreign Application Priority Data

Dec. 22, 2014   (TW) .............................. 103144756 A

(51) Int. Cl.
| | |
|---|---|
| *G06F 21/00* | (2013.01) |
| *G06F 21/46* | (2013.01) |
| *G06F 21/31* | (2013.01) |
| *G06F 21/83* | (2013.01) |

(52) U.S. Cl.
CPC .............. *G06F 21/46* (2013.01); *G06F 21/31* (2013.01); *G06F 21/83* (2013.01)

(58) Field of Classification Search
CPC ............ G06F 21/83; G06F 21/31; G06F 21/46
See application file for complete search history.

(56) References Cited

U.S. PATENT DOCUMENTS

| | | | | |
|---|---|---|---|---|
| 8,694,791 | B1* | 4/2014 | Rohrweck | G06F 21/36 455/418 |
| 2011/0302518 | A1* | 12/2011 | Zhang | G06F 3/0234 715/773 |
| 2012/0124662 | A1* | 5/2012 | Baca | G06F 21/32 726/17 |
| 2012/0167202 | A1* | 6/2012 | Kim | G06F 21/42 726/19 |
| 2013/0139248 | A1* | 5/2013 | Rhee | G06F 3/0346 726/19 |
| 2013/0162392 | A1 | 6/2013 | Chen | |
| 2013/0263251 | A1* | 10/2013 | Fleizach | G06F 3/04883 726/19 |
| 2014/0047525 | A1* | 2/2014 | Bonhoff | G06F 21/31 726/7 |
| 2014/0059674 | A1* | 2/2014 | Sun | G06F 21/31 726/19 |

(Continued)

FOREIGN PATENT DOCUMENTS

| | | |
|---|---|---|
| CN | 1758551 | 4/2006 |
| CN | 102984356 | 3/2013 |
| CN | 102999280 | 3/2013 |

*Primary Examiner* — Don Zhao
(74) *Attorney, Agent, or Firm* — Jianq Chyun IP Office

(57) ABSTRACT

A handheld electronic device and a method for entering a password thereof are provided. The method includes following steps. Motion change information of the handheld electronic device in three-axis directions is detected. One current candidate password information in a plurality of candidate password information is provided to display on a display screen according to the motion change information. The current candidate password information is set as a selected password information according to a selection operation.

18 Claims, 5 Drawing Sheets

(56) References Cited

U.S. PATENT DOCUMENTS

| | | | |
|---|---|---|---|
| 2014/0157400 A1* | 6/2014 | Kwon | G06F 21/45 |
| | | | 726/16 |
| 2014/0181956 A1* | 6/2014 | Ahn | G06F 21/46 |
| | | | 726/18 |
| 2014/0201831 A1* | 7/2014 | Yi | G06F 21/31 |
| | | | 726/19 |
| 2014/0201832 A1* | 7/2014 | Yi | G06F 21/31 |
| | | | 726/19 |
| 2014/0283015 A1* | 9/2014 | Ancona Novelo | G06F 21/31 |
| | | | 726/19 |
| 2014/0344923 A1* | 11/2014 | Wang | G06F 21/36 |
| | | | 726/19 |
| 2015/0178489 A1* | 6/2015 | Nakano | G06F 21/32 |
| | | | 726/19 |
| 2015/0235024 A1* | 8/2015 | Corrion | G06F 21/56 |
| | | | 726/18 |
| 2015/0358043 A1* | 12/2015 | Jeong | H04B 1/385 |
| | | | 455/411 |
| 2016/0026784 A1* | 1/2016 | Zheng | G06F 21/36 |
| | | | 726/19 |
| 2016/0124522 A1* | 5/2016 | Sumitomo | G06F 21/31 |
| | | | 345/156 |

* cited by examiner

HANDHELD ELECTRONIC DEVICE AND METHOD FOR ENTERING PASSWORD THEREOF

CROSS-REFERENCE TO RELATED APPLICATION

This application claims the priority benefit of Taiwan application serial no. 103144756, filed on Dec. 22, 2014. The entirety of the above-mentioned patent application is hereby incorporated by reference herein and made a part of this specification.

BACKGROUND

Technical Field

The invention relates to a password entering technique, and particularly relates to a handheld electronic device applying a somatosensory technology and a method for entering password.

Related Art

In modern society, handheld electronic devices such as smart phones, tablet personal computers (PCs), personal digital assistants (PDAs), etc. have become an indispensable part of people's daily life. Most of the current handheld electronic devices adopt a touch control technique to implement a lock mechanism, for example, to lock or unlock a screen, a button, etc. When the handheld electronic device is in a lock mode, most of touch operation functions are filtered, so as to avoid unexpected touch of the screen to cause unintentional operation performed by the handheld electronic device.

However, during the period of using the handheld electronic device, the handheld electronic device is probably unlocked by mistake due to a narrow space (for example, a purse or a pocket) used for accommodating the handheld electronic device. On the other hand, environmental factors such as dirt, fingerprints, etc. caused by the touch operation may also cause an incorrect password or even unable to be entered. A method of purely entering numbers or letters is easy to be cracked by others so that security thereof is insufficient. Moreover, by using the touch control technique to implement unlocking of the handheld electronic device is inconvenient in usage for visually impaired or visually weak people.

SUMMARY

The invention is directed to a handheld electronic device and a method for entering password, by which a problem of error unlocking or password entering error caused by misjudgement of a touch operation is avoided, and the handheld electronic device and the method for entering password are convenient for visually impaired or visually weak people to use, and complexity of an unlocking operation is enhanced to improve security.

According to an embodiment, the invention provides a method for entering password, which is adapted to a handheld electronic device having a display screen. The method for entering password includes following steps. A motion change information of the handheld electronic device in three-axis directions is detected. A current candidate password information in a plurality of candidate password information is provided to display on the display screen according to the motion change information. The current candidate password information is set as a selected password information according to a selection operation.

According to an embodiment, the invention provides a handheld electronic device including a display screen, a motion sensor and a control unit. The control unit is coupled to the display screen and the motion sensor. The control unit detects a motion change information of the handheld electronic device in three-axis directions through the motion sensor, provides a current candidate password information in a plurality of candidate password information to display on a display screen according to the motion change information, and sets the current candidate password information as a selected password information according to a selection operation.

According to the above descriptions, in the handheld electronic device and the method for entering password of the invention, a somatosensory technology is used to detect the motion change information of the handheld electronic device in the three-axis directions, such that one of a plurality of candidate password information is selected for entering, so as to avoid the problem of error unlocking or password entering error caused by touch operation misjudgement. Moreover, based on a design that the password information includes a password value and a moving direction, complexity of the unlock operation is enhanced, and then security is improved. In addition, in collaboration with an audio prompt, the problem that the handheld electronic device is inconvenient in usage for visually impaired or visually weak people is also mitigated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In order to improve problems of unintentional touch and inadequate security caused by using a touch control technique to enter password in the conventional technique, and facilitate visually impaired or visually weak people to operate a handheld electronic device, embodiments of the invention provide a method for entering password, by which a somatosensory technology is used to detect a motion change information of the handheld electronic device in three-axis directions, such that a user can select one of a plurality of candidate password information for entering password by changing a motion state of the electronic device. By combining two parameters of a password value and a moving direction, complexity of the unlock operation is enhanced, and security of password entering is improved. In addition, an audio prompt can be used to assist the visually impaired or visually weak people to operate the handheld electronic device. In order to clearly describe the content of the invention, reference will now be made in detail to the present preferred embodiments of the invention.

Figure 1:
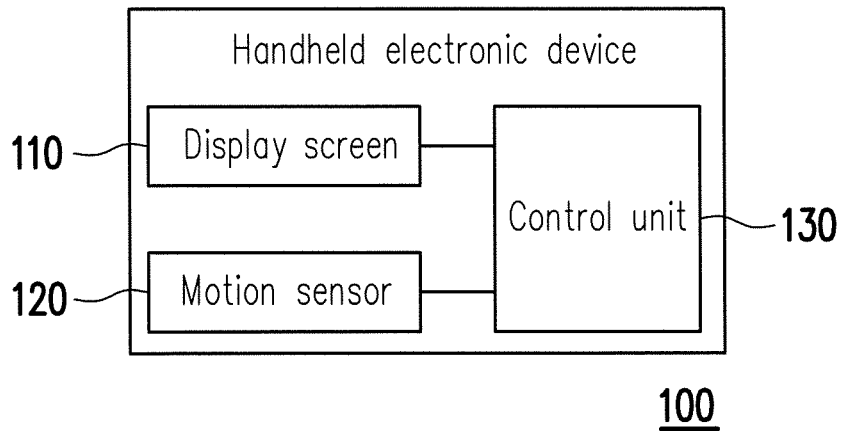
FIG. 1 is a block diagram of a handheld electronic device according to an embodiment of the invention.

FIG. 1 is a block diagram of a handheld electronic device according to an embodiment of the invention. Referring to FIG. 1, the handheld electronic device 100 is, for example, a mobile phone, a smart phone, a tablet personal computer (PC), a personal digital assistant (PDA), an e-book, or a game machine, etc. The handheld electronic device 100 includes a display screen 110, a motion sensor 120 and a control unit 130, and functions thereof are respectively described as follows.

The display screen 110 is, for example, a liquid crystal display (LCD), a light-emitting diode (LED) display, a field emission display (FED) or other types of display. In some embodiments, the display screen 110 can also be a touch display screen formed by one of the aforementioned displays and a resistive touch panel, a capacitive touch panel, an optical touch panel, or an ultrasonic touch panel, etc., so as to simultaneously provide a display function and a touch operation function.

The motion sensor 120 is, for example, a detecting element such as a G-sensor, an accelerometer, a gyroscope, a magnetometer, etc., or a combination thereof, though the invention is not limited thereto. In the present embodiment, the motion sensor 120 can be used for detecting a motion change information such as an azimuth angle, a speed and a displacement, etc. of the handheld electronic device 100 in a three-dimensional (3D) space.

The control unit 130 is coupled to the display screen 110 and the motion sensor 120. The control unit 130 is, for example, a single chip, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), a processor of any other types of integrated circuit, state machine, advanced RISC machine (ARM) and similar devices. The control unit 130 is not limited to be a single processing element, which can also be implemented by two or more than two processing elements. In the present embodiment, the control unit 130 is used for executing the method for entering password of the invention.

Moreover, the handheld electronic device 100 may further include a storage device (not shown), a prompter (not shown), through the invention is not limited thereto. The storage device can be used for storing data (for example, a plurality of candidate password information, at least one selected password information or a predetermined password information combination), and the stored data can be accessed by the control unit 130. The storage device is, for example, a hard disk drive (HDD), a volatile memory and a non-volatile memory. The prompter can be coupled to the control unit 130, and is, for example, an audio output device such as a speaker, etc. that is capable of outputting an audio prompt.

Figure 2:
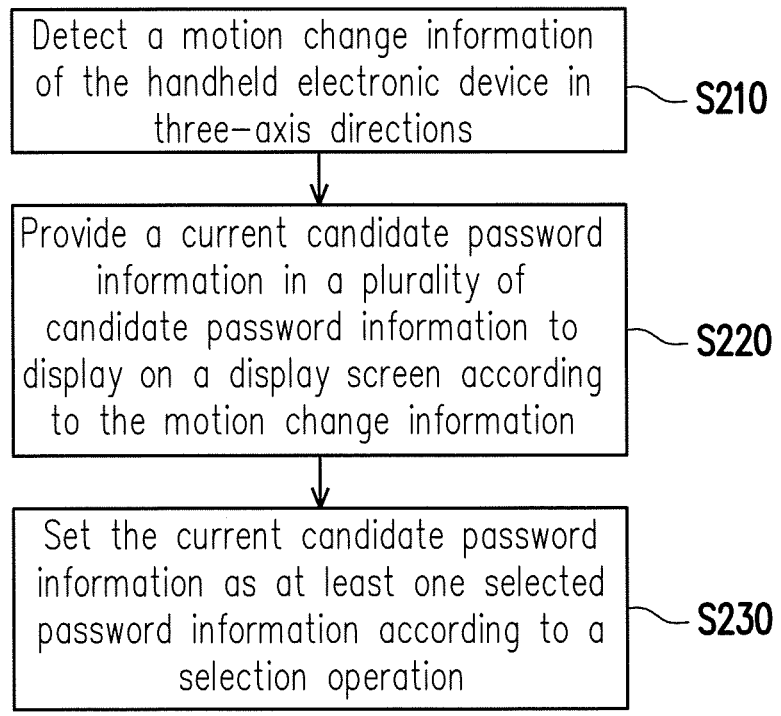
FIG. 2 is a flowchart illustrating a method for entering password according to an embodiment of the invention.

FIG. 2 is a flowchart illustrating a method for entering password according to an embodiment of the invention. The method of the present embodiment is adapted to the handheld electronic device 100 of FIG. 1. Detailed steps of the method of the present embodiment are described below with reference of various components shown in FIG. 1.

Referring to FIG. 1 and FIG. 2, in step S210, the control unit 130 detects a motion change information of the handheld electronic device 100 in three-axis directions through the motion sensor 120. In the present embodiment, the motion change information is, for example, a moving speed and a moving direction on one or a plurality of dimensions, which can be determined by a magnitude or direction of a displacement or angle change.

Then, in step S220, the control unit 130 provides a current candidate password information in a plurality of candidate password information to display on the display screen 110 according to the motion change information. In the present embodiment, each operation of detecting the motion change information to provide one candidate password information can be regarded as an updating operation of the current candidate password information performed by the control unit 130. In other words, the motion change information can be used to determine the updating operation of the current candidate password information.

Then, the user can execute a selection operation to notify the handheld electronic device 100 to select the current candidate password information. Therefore, in step S230, the control unit 130 sets the current candidate password information as a selected password information according to the selection operation. In this way, by detecting the motion change information of the handheld electronic device 100, the user can enter password information.

It should be noticed that in the present embodiment, the selected password information may include at least one of a password value and a moving direction. Through different forms of password presentation method, password complexity is enhanced to improve security.

In following descriptions, the display screen is, for example, a touch display screen 310 capable of simultaneously providing a display function and a touch operation function, and the selection operation is, for example, a selection touch operation performed on the touch display screen 310. Detailed implementation for detecting the motion change information of the handheld electronic device 100 is first described below.

In an embodiment, the control unit 130, for example, obtains the motion change information according to an initial position and a current position of the handheld electronic device 100. To be specific, the motion sensor 120 can detect the initial position of the handheld electronic device 100 in the three-axis directions, and detect the current position of the handheld electronic device 100 in the three-axis directions, such that the control unit 130 can calculate the moving speed and moving direction of the handheld electronic device 100 according to the initial position and the current position.

Figure 3A:
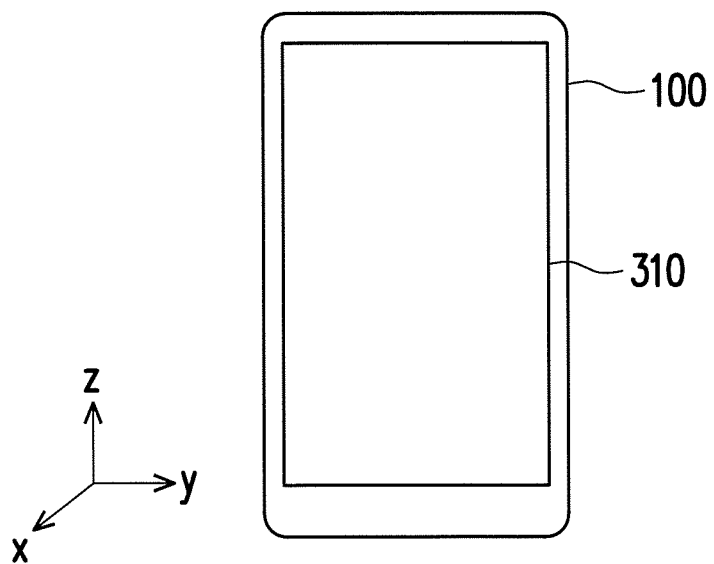
FIG. 3A to FIG. 3C are schematic diagrams of a handheld electronic device according to an embodiment of the invention.
Figure 3B:
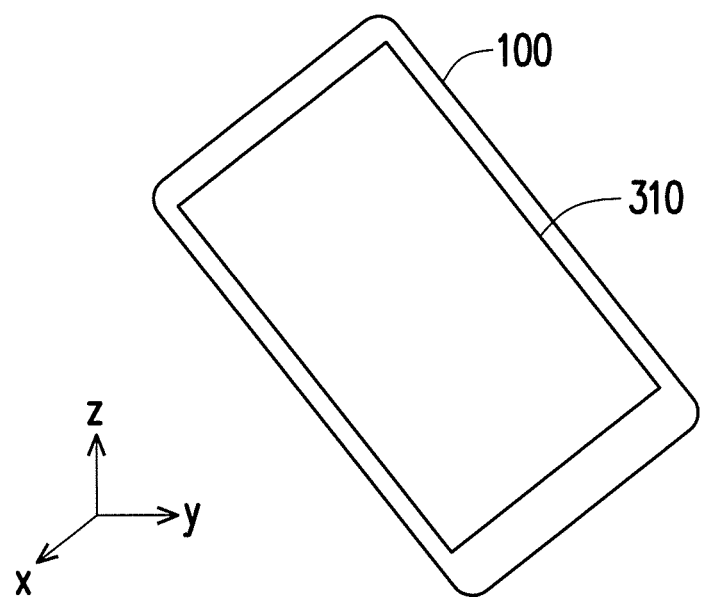
Figure 3C:
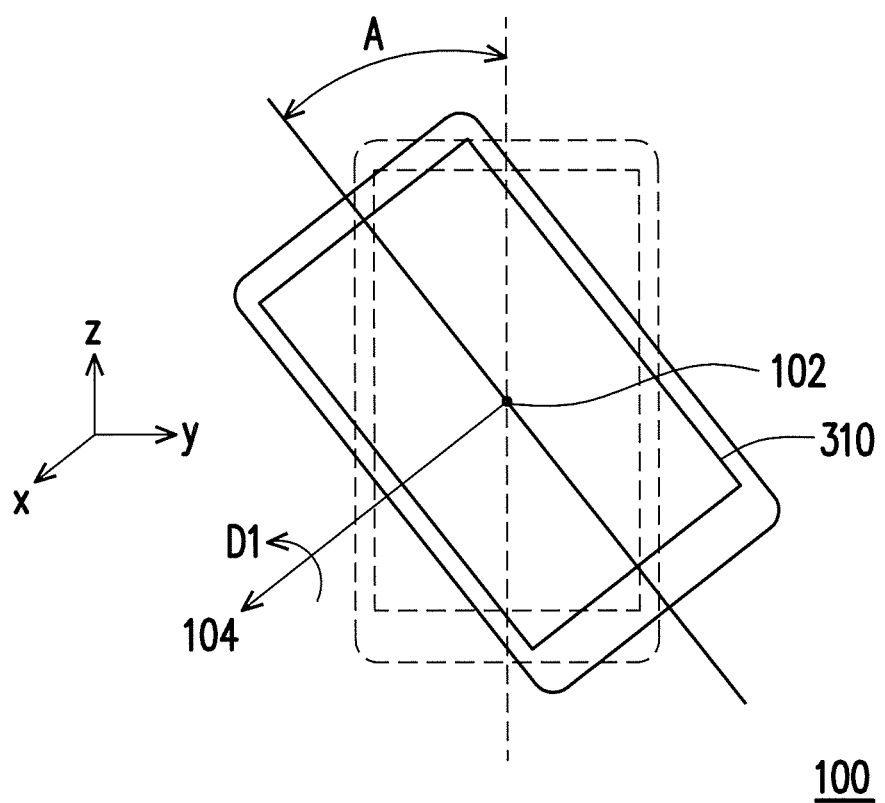

For example, FIG. 3A to FIG. 3C are schematic diagrams of a handheld electronic device according to an embodiment of the invention. FIG. 3A illustrates a placement status of the handheld electronic device 100 at the initial position, FIG. 3B illustrates a placement status of the handheld electronic device 100 at the current position, and FIG. 3C is a schematic diagram of the handheld electronic device 100 moving from the initial position (referring to FIG. 3A) to the current position (referring to FIG. 3B). For simplicity's sake, only necessary components are indicated in FIG. 3A to FIG. 3B. In the present embodiment, x, y, z axes construct a three-axis coordination system, which is used for indicating the motion change of the handheld electronic device 100.

Therefore, the motion sensor 120 detects the initial position of the handheld electronic device 100, and detects the current position of the handheld electronic device 100, and the control unit 130 calculates the motion change information. In the present embodiment, the control unit 130, for example, simplifies the motion change of the handheld electronic device 100 into a change of a rotation angle. Therefore, as shown in FIG. 3C, the motion change information formed by rotating the handheld electronic device 100 along a direction D1 (for example, and anticlockwise direction) by an angle A while taking a body direction 104 (i.e., an x-axis direction) of a body center 102 as a rotation axis is obtained. In other words, the direction D1 may correspond to the moving direction, and the angle A may correspond to the moving speed, where a magnitude of the angle A is positively related to the moving speed. In another embodiment, the moving speed can also be determined by an angular velocity of the handheld electronic device 100 when the handheld electronic device 100 is rotated by the angle A.

In other embodiments, the control unit 130 can also determine the motion change information of the handheld electronic device 100 according to a vector mode and a total change amount thereof. Those skilled in the art can adaptively extract the proper motion change information from the motion variation of the handheld electronic device 100 according to a design requirement, which is not limited by the invention.

Regarding detailed implementation for providing the current candidate password information, in an embodiment, the candidate password information can be arranged in an information sequence. The control unit 130, for example, converts the moving speed in the motion change information into a displacement amount in the information sequence, and converts the moving direction in the motion change information into a displacement direction in the information sequence. In this way, in the information sequence, the control unit 130 can change the current candidate password information according to the displacement direction and the displacement amount, so as to update the current candidate password information.

Referring to the embodiment of FIG. 3A to FIG. 3C for further description, as described above, the control unit 130 may obtain the moving speed (i.e., the angle A) and the moving direction (i.e., the direction D1) in the motion change information. Moreover, the handheld electronic device 100, for example, includes 100 candidate password information arranged in an information sequence. Therefore, the direction D1 can determine the displacement direction of the current candidate password information in the information sequence (for example, moving in the information sequence according to a progressive increasing direction or a progressive decreasing direction), and the angle A can determine the displacement amount of the current candidate password info nation in the information sequence. When the password information includes numbers of 0 to 99, and the current candidate password information corresponding to the initial position is 0, according to the motion change information of the direction D1 and the angle A, the current candidate password information includes a password value "12" and a moving direction of "left." It should be noticed that in the present embodiment, the direction D1 can be regarded as an anticlockwise rotation along the x-axis, so that when the motion sensor 120 detects that the motion change information of the handheld electronic device 100 indicates a rotation direction inversed to the direction D1 (i.e., a clockwise rotation along the x-axis), the moving direction can be set to "right." However, the aforementioned password value and the moving direction are only used as an example, and the invention is not limited thereto.

Then, when the control unit 130 receives the selection touch operation from the user, the control unit 130 sets the password value "12" and the moving direction of "left" as the selected password information, so as to implement a function of entering the password information by using the motion change information. The aforementioned selection touch operation is, for example, a touch operation such as a click operation, a long press operation or a slide operation performed by the user on a button image displayed on the display screen 110. Alternatively, in other embodiments, the user may also press a physical key to select the selected password information, which is not limited by the invention.

On the other hand, when the current candidate password information is not the password information the user intents to enter, the user can further move the handheld electronic device 100 to change the motion change information of the handheld electronic device 100, so as to update the current candidate password information to the desired password information.

It should be noticed that in an embodiment, the user can further perform a start touch operation to notify the handheld electronic device 100 to start detecting and recording the motion change information of the handheld electronic device 100. To be specific, the control unit 130 can receive the start touch operation to determine whether to start detecting the motion change information of the handheld electronic device 100 in the three-axis directions. The start touch operation is, for example, a touch operation such as a click operation, a long press operation or a slide operation. In the present embodiment, the control unit 130 can receive the start touch operation and the selection touch operation through the same button image. Therefore, when the user wants to enter a plurality of password information, the selection touch operation performed to a previous password information can be regarded as the start touch operation of the current password information. In this way, an operation procedure for entering the password can be simplified. In other embodiments, the control unit 130 can also respectively receive the start touch operation and the selection touch operation through different button images. In this way, the handheld electronic device 100 can clearly learn a start time point and an end time point that the user enters a password, so as to reduce occurrence of wrong judgement.

Figure 4:
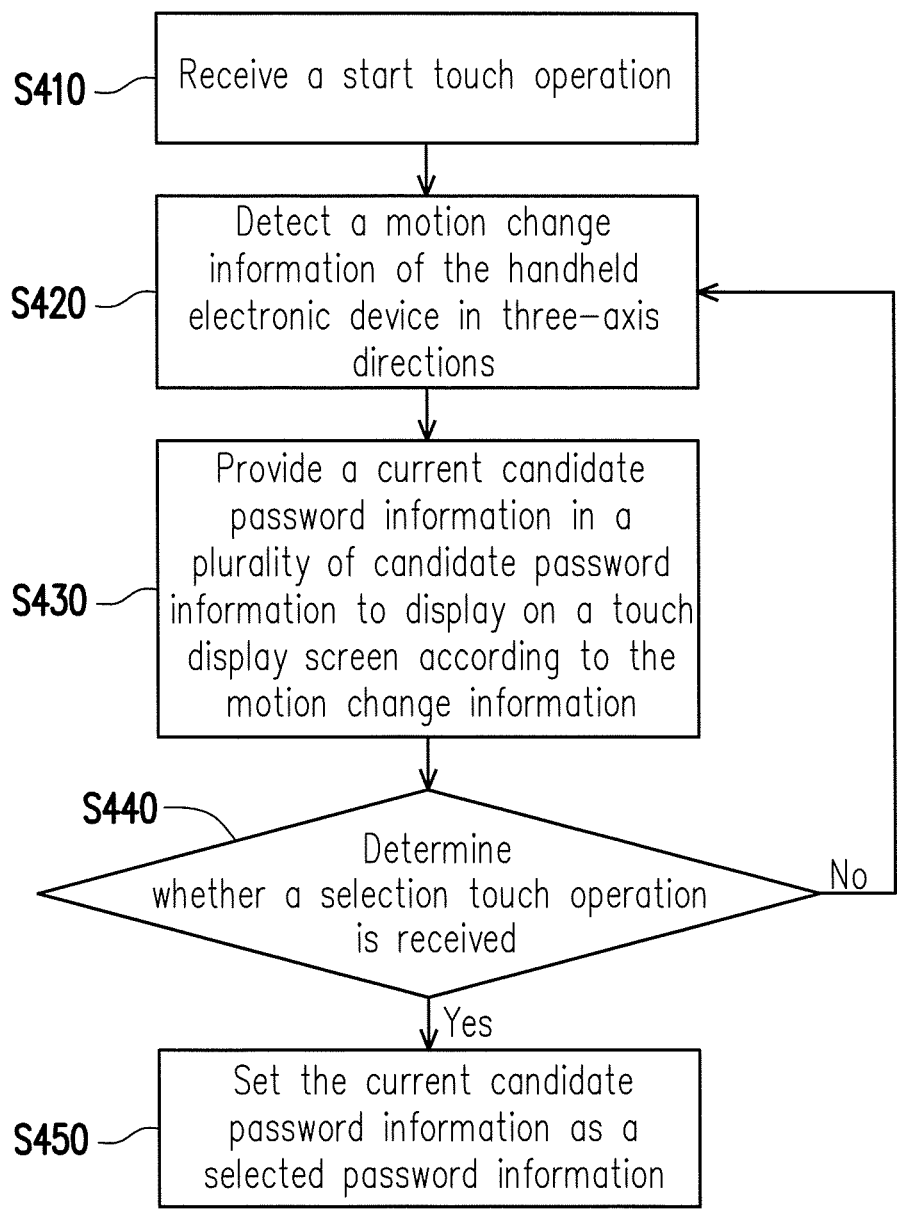
FIG. 4 is a flowchart illustrating a method for entering password according to an embodiment of the invention.

FIG. 4 is a flowchart illustrating a method for entering password according to an embodiment of the invention, in which a detailed flow of the aforementioned embodiment is illustrated. In step S410, the control unit 130 receives a start touch operation through the touch display screen 310. In step S420, the control unit 130 detects a motion change information of the handheld electronic device 100 in the three-axis directions through the motion sensor 120. In step S430, the control unit 130 provides a current candidate password information in a plurality of candidate password information to display on the touch display screen 310 according to the motion change information. In step S440, the control unit 130 determines whether a selection touch operation is received through the touch display screen 310. When the control unit 130 determines that the selection touch operation is received, in step S450, the control unit 130 sets the current candidate password information as a selected password information, and when the control unit 130 determines that the selection touch operation is not received, the flow returns to the step S420 to continually detect the motion change information of the handheld electronic device 100 in the three-axis directions.

It should be noticed that in an embodiment, the control unit 130 can initialize the motion change information according to an original position of the handheld electronic device 100 in the three-axis directions. The original position is, for example, a position, an azimuth angle, etc. of the handheld electronic device 100 in the three-axis direction when the hand held electronic device 100 is in a lock mode and when the user is about to enter the password information to perform the start touch operation. Therefore, the control unit 130 can set the original position as a reference for latter detection of the motion change information performed through the motion sensor 120, so as to obtain a more accurate detection result.

Figure 5:
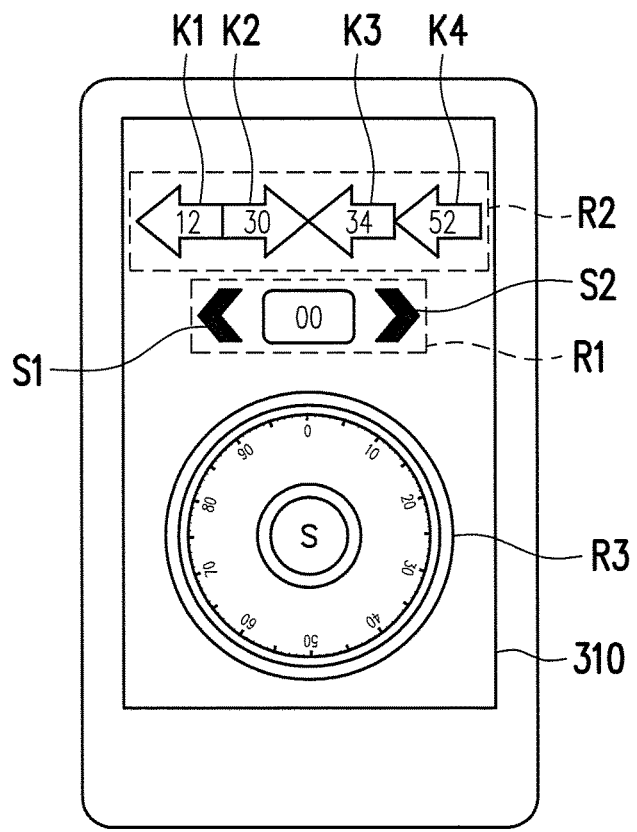
FIG. 5 is a schematic diagram of a display image of a handheld electronic device according to an embodiment of the invention.

A display image of password entering is described below. FIG. 5 is a schematic diagram of a display image of the handheld electronic device according to an embodiment of the invention.

Referring to FIG. 5, in an embodiment, the control unit 130 provides the current candidate password information in a plurality of candidate password information according to the motion change information, and displays the current candidate password information in a region R1 on the touch display screen 310. The password value of the current candidate password information can be displayed in a numeral form, and the moving directions can be indicated by a left arrow S1 and a right arrow S2, and flicking or other display effects can be used to prompt the moving direction corresponding to the current operation of the user. In other embodiments, the moving directions can also be represented by upper and lower arrows or text, which is not limited by the invention.

When the control unit 130 sets the current candidate password information as the selected password info illation, the control unit 130 can further display the selected password information in a region R2. Particularly, in an embodiment, the control unit 130 can combine the password value and the moving direction in the selected password information into a single symbol for displaying, for example, symbols K1 to K4 shown in FIG. 5. It should be noticed that regarding a case that the user successively enters a plurality of password information, the control unit 130 can sequentially display the selected password information in the region R2 according to a selection sequence of the current candidate password information. For example, in the present embodiment, the password information "left 12," "right 30," "left 34," "left 52" selected by the user can be sequentially arranged in the region R2 from left to right.

Moreover, the touch display screen 310 can display a button image S, such that the control unit 130 can receive the selection touch operation and the start touch operation through the button image S. In other embodiments, the touch display screen 310 may also display the aforementioned image through a display screen only having the display function, and the handheld electronic device 100 may receive a selection operation and a start operation through a physical key, which is not limited by the invention.

It should be noticed that in the embodiment of FIG. 5, the control unit 130 can display the candidate password information in an annular numeral dial image R3 on the touch display screen 310. The control unit 130 can correspondingly display the password value of the current candidate password information in the region R1 at a 12 o'clock position in the numeral dial image R3. In other words, the candidate password information of the present embodiment is, for example, arranged in an annular sequence, and when the control unit 130 updates the current candidate password information, the control unit 130 can also update a display pattern of the numeral dial image R3 through a rotation display manner, so as to simulate a visual effect of dial rotation in an actual practice, and deepen an operating experience of the user when selecting the password information. It should be noticed that in the present embodiment, the shape or display position of the numeral dial image R3 is not limited. Moreover, in some embodiments, the numeral dial image R3 can be omitted without being displayed.

Figure 6:
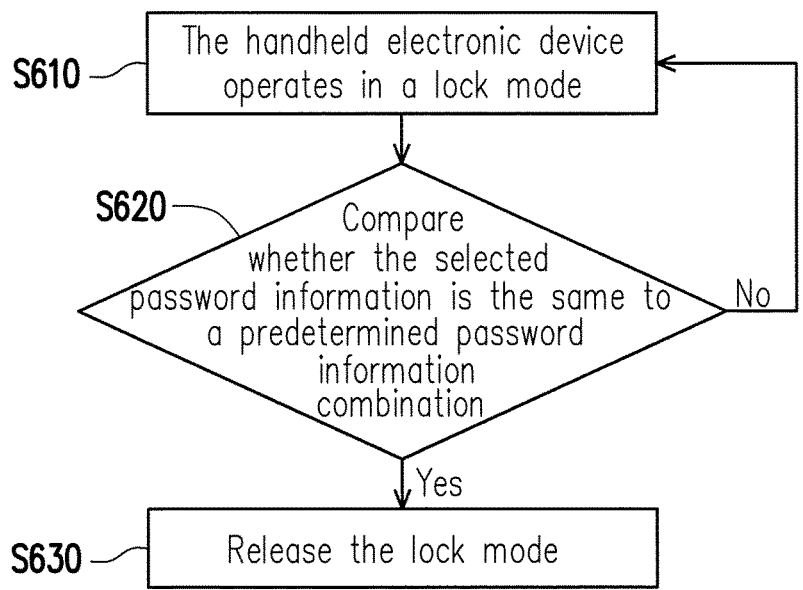
FIG. 6 is a flowchart illustrating a method for entering password according to an embodiment of the invention.

It should be noticed that the method for entering password of the invention can also be applied to an unlock mechanism of the handheld electronic device 100. Referring to FIG. 6, FIG. 6 is a flowchart illustrating a method for entering password according to an embodiment of the invention. In step S610, the handheld electronic device 100 operates in a lock mode. Then, the control unit 130 can execute the steps S410 to S450 of FIG. 4 to obtain a selected password information, or repeatedly executes the step flow of FIG. 4 to obtain a plurality of candidate password information having a specific sequence.

Then, in step S620, the control unit 130 compares the selected password information with a predetermined password information combination, where the aforementioned selected password information can be one or a plurality of selected password information. When the selected password information is the same to the predetermined password information combination, the control unit 130 releases the lock mode of the handheld electronic device 100, and when the selected password information and the predetermined password information combination are different, the control unit 130 maintains the lock mode of the handheld electronic device 100.

Therefore, regarding the embodiment of FIG. 6, if the control unit 130 sets the predetermined password information combination as "left 12," "right 30," "left 34," "left 52," after the user enters the aforementioned candidate password information, the lock mode is released.

Particularly, when the control unit 130 provides the current candidate password information for displaying on the touch display screen 310, the control unit 130 can further provide an audio prompt signal corresponding to the current candidate password information through a prompter. To be specific, in an embodiment, a password value corresponding to the current candidate password information can be output through an audio output manner. In this way, visually impaired or visually weak people can be assisted to learn the password value in the current candidate password information through the audio output, so as to determine whether to select the password value. In other embodiments, the control unit 130 can also prompt the moving direction corresponding to the current candidate password information through flicking or different colors displayed on the touch display screen 310. The method that the handheld electronic device 100 presents the current candidate password information to the user is not limited by the invention.

Moreover, according to the embodiments of the invention, since the user can enter the password information by only changing a position of the handheld electronic device 100, a risk of being peeped by others when the password is entered through a virtual keyboard is effectively decreased.

In summary, in the handheld electronic device and the method for entering password of the invention, a somatosensory technology is used to detect the motion change information of the handheld electronic device in the three-axis directions, such that the user can select one of a plurality of candidate password information for entering by changing a motion state of the handheld electronic device. Moreover, based on the password information of the password value and the moving direction, complexity of the unlock operation is enhanced, and security is improved. In addition, in the embodiments of the invention, a visual display can be selectively provided in collaboration with an audio prompt, so as to improve usage convenience of the handheld electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for entering password, adapted to a handheld electronic device having a display screen, the method for entering password comprising:
   detecting motion change information of the handheld electronic device in three-axis directions comprising:
      detecting an initial position and a current position of the handheld electronic device in the three-axis directions; and
      calculating a moving speed and a moving direction of the handheld electronic device according to the initial position and the current position;
   displaying current candidate password information selected from a plurality of existing candidate password information arranged in an information sequence on the display screen according to the motion change information comprising:
      converting the moving speed and the moving direction into a displacement amount and a displacement direction, respectively, in the information sequence; and
      updating the current candidate password information according to the displacement direction and the displacement amount in the information sequence; and
   setting the current candidate password information as at least one selected password information according to a selection operation.

2. The method for entering password as claimed in claim 1, wherein the at least one selected password information comprises at least one of a password value and the moving direction.

3. The method for entering password as claimed in claim 1, further comprising: displaying the existing candidate password information on an annular numeral dial image on the display screen.

4. The method for entering password as claimed in claim 1, wherein the display screen is a touch display screen simultaneously providing a display function and a touch operation function, and the selection operation is a selection touch operation performed on the touch display screen.

5. The method for entering password as claimed in claim 4, wherein the touch display screen further displays a button image, and the step of setting the current candidate password information as at least one selected password information comprises: receiving the selection touch operation through the button image, so as to select the current candidate password information as the at least one selected password information.

6. The method for entering password as claimed in claim 5, wherein before the step of detecting the motion change information of the handheld electronic device in the three-axis directions, the method further comprises: receiving a start touch operation through the button image, so as to determine whether to start detecting the motion change information of the handheld electronic device in the three-axis directions.

7. The method for entering password as claimed in claim 1, wherein before the step of detecting the motion change information of the handheld electronic device in the three-axis directions, the method further comprises: initializing the motion change information according to an original position of the handheld electronic device in the three-axis directions.

8. The method for entering password as claimed in claim 1, wherein the handheld electronic device further operates in a lock mode, and the method further comprises:
   comparing the at least one selected password information with a predetermined password information combination; and
   releasing the lock mode when the at least one selected password information is the same to the predetermined password information combination.

9. The method for entering password as claimed in claim 1, wherein the step of providing the current candidate password information to display on the display screen comprises: providing an audio prompt signal corresponding to the current candidate password information.

10. A handheld electronic device, comprising:
    a display screen;
    a motion sensor; and
    a control unit, coupled to the display screen and the motion sensor,
       detecting motion change information of the handheld electronic device in three-axis directions through the motion sensor,
       displaying current candidate password information selected from a plurality of existing candidate password information arranged in an information sequence on the display screen according to the motion change information, and
       setting the current candidate password information as at least one selected password information according to a selection operation,
          wherein the motion sensor detects an initial position and a current position of the handheld electronic device in the three-axis directions,
          wherein the control unit calculates a moving speed and a moving direction of the handheld electronic device according to the initial position and the current position, converts the moving speed and the moving direction into a displacement amount and a displacement direction, respectively, in the information sequence, and updates the current candidate password information according to the displacement direction and the displacement amount in the information sequence.

11. The handheld electronic device as claimed in claim 10, wherein the at least one selected password information comprises at least one of a password value and the moving direction.

12. The handheld electronic device as claimed in claim 10, wherein the control unit further displays the existing candidate password information on an annular numeral dial image on the display screen.

13. The handheld electronic device as claimed in claim 10, wherein the display screen is a touch display screen simultaneously providing a display function and a touch operation function, and the selection operation is a selection touch operation performed on the touch display screen.

14. The handheld electronic device as claimed in claim 13, wherein the touch display screen further displays a button image, and the control unit receives the selection touch operation through the button image, so as to select the current candidate password information as the at least one selected password information.

15. The handheld electronic device as claimed in claim 14, wherein the control unit further receives a start touch operation through the button image, so as to determine whether to start detecting the motion change information of the handheld electronic device in the three-axis directions.

16. The handheld electronic device as claimed in claim 10, wherein the control unit further initializes the motion change information according to an original position of the handheld electronic device in the three-axis directions.

17. The handheld electronic device as claimed in claim 10, wherein the handheld electronic device further operates in a lock mode, and the control unit compares the at least one selected password information with a predetermined password information combination, and releases the lock mode when the at least one selected password information is the same to the predetermined password information combination.

18. The handheld electronic device as claimed in claim 10, further comprising: a prompter, coupled to the control unit, for providing an audio prompt signal corresponding to the current candidate password information.

* * * * *